US008702352B2

(12) United States Patent
Sjöö

(10) Patent No.: US 8,702,352 B2
(45) Date of Patent: Apr. 22, 2014

(54) MILLING TOOL FOR CUTTING MACHINING

(75) Inventor: Sture Sjöö, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 280 days.

(21) Appl. No.: 13/042,373

(22) Filed: Mar. 7, 2011

(65) Prior Publication Data

US 2011/0229278 A1    Sep. 22, 2011

(30) Foreign Application Priority Data

Mar. 17, 2010    (SE) ...................................... 1050243

(51) Int. Cl.
*B23C 5/20*    (2006.01)
*B23C 5/28*    (2006.01)

(52) U.S. Cl.
USPC .............................................. 407/40; 407/67

(58) Field of Classification Search
USPC ................... 407/66, 67, 30, 33, 34; 82/163
See application file for complete search history.

(56) References Cited

U.S. PATENT DOCUMENTS

| | | | |
|---|---|---|---|
| 2,133,867 A | 10/1938 | Lucas | |
| 3,464,098 A * | 9/1969 | Middle et al. | 407/42 |
| 3,559,512 A | 2/1971 | Aggarwal | |
| 3,690,414 A | 9/1972 | Aggarwal et al. | |
| 6,076,999 A * | 6/2000 | Hedberg et al. | 407/66 |
| 6,477,927 B1 | 11/2002 | Albo et al. | |
| 6,595,727 B2 | 7/2003 | Arvidsson | |
| 6,945,740 B2 | 9/2005 | Svenningsson et al. | |
| 7,938,599 B2 * | 5/2011 | Takiguchi et al. | 407/35 |
| 2003/0147707 A1 * | 8/2003 | Perkowski | 407/30 |
| 2005/0214087 A1 | 9/2005 | Agapiou et al. | |
| 2006/0275090 A1 | 12/2006 | Onozuka et al. | |
| 2008/0226401 A1 | 9/2008 | Hoefler et al. | |
| 2009/0187270 A1 | 7/2009 | Hoefler | |
| 2010/0296889 A1 | 11/2010 | Lundblad et al. | |
| 2011/0103903 A1 * | 5/2011 | Sture | 407/11 |
| 2011/0182679 A1 * | 7/2011 | Bierl et al. | 407/53 |
| 2011/0229278 A1 | 9/2011 | Sjöö | |
| 2013/0004250 A1 * | 1/2013 | Gamble | 407/40 |

FOREIGN PATENT DOCUMENTS

| | | |
|---|---|---|
| JP | 2005-329509 | 12/2005 |
| JP | 2009-226548 A | 10/2009 |
| JP | 2009-233800 A | 10/2009 |

(Continued)

OTHER PUBLICATIONS

Tlusty, "Dynamics of High-Speed Milling," *Journal of Engineering for Industry*, vol. 108, May 1986, pp. 59-67.

(Continued)

*Primary Examiner* — Will Fridie, Jr.
(74) *Attorney, Agent, or Firm* — Morgan, Lewis & Bockius LLP

(57) ABSTRACT

A milling tool for rotary cutting machining, including a tool body having a rotation axis, a plurality of insert seats adapted to receive respective milling inserts arranged in one end of the tool body, and a plurality of damping members arranged inside the tool body which suppress operation-induced vibrations in the tool. The damping members being arranged radially displaced from the rotation axis, displaced from the insert seats, and adjacent to the one end of the tool body.

29 Claims, 7 Drawing Sheets

(56) References Cited

FOREIGN PATENT DOCUMENTS

| SU | 1214343 A | 10/1984 |
|---|---|---|
| WO | WO 02/45892 A1 | 6/2002 |
| WO | 2008/002145 | 1/2008 |

OTHER PUBLICATIONS

Smith, et al.; "An Overview of Modeling and Simulation of the Milling Process," *Journal of Engineering for Industry*, vol. 113, May 1991, pp. 169-175.

Hoefler; "Time Domain Simulations of Metal-Cutting Systems with Experimental Verification," Thesis submitted to the Department of Mechanical Engineering at Northern Illinois University, Dec. 1997.

E. Leigh et al., "Applying High-Speed Machining Techniques on Rotor Grip Configurations," *AHS International*, Presented at the American Helicopter Society 55th Annual Forum, May 25-27, 1999, Montreal, Canada, pp. 1-16.

"Metalmax," [Online] Manufacturing Laboratories, Inc. 2001 [retrieved on Jan. 21, 2009]. Retrieved from the Internet: <www.mfg-labs.com>.

E. Leigh et al., "Advanced Machining Techniques on Titanium Rotor Parts," *AHS International*, Presented at the American Helicopter Society 55th Annual Forum , May 2-4, 2000, Virginia Beach, VA, pp. 1-19.

P. Darcy, "Productivity Improvements Through Collaboration," Presented at the American Helicopter Society 58th Annual Forum, Jun. 11-13, 2002, Montreal, Canada, pp. 1-12.

P. Zelinski, "Find the Right Speed for Chatter-Free Milling," [Online] *Modern Machine Shop,* [Retrieved on Oct. 25, 2007], pp. 1-2. Retrieved from the Internet: <http://www.mmsoline.com/articles/article_printl.cfm>.

Smith, "Reasons for stable milling zones," *Cutting Tool Engineering*, vol. 64, Issue 10, Oct. 2012, pp. 24-25.

Smith, "The science of milling sounds," *Cutting Tool Engineering*, vol. 65, Issue 2, Feb. 2013, pp. 20-21.

P. Zelinski, "The Overhang Effect," [Online] *Modern Machine Shop,* pp. 1-5. Retrieved from the Internet: <www.mmsonline.com>.

P. Zelinski, "Maximum Aluminum," [Online] *Modern Machine Shop,* pp. 1-6. Retrieved from the Internet: <www.mmsonline.com>.

P. Zelinski, "High Speed Machining: Aerospace Boeing's One Part Harmony," [Online] *Modern Machine Shop,* pp. 1-8. Retrieved from the Internet: <www.mmsonline.com>.

* cited by examiner

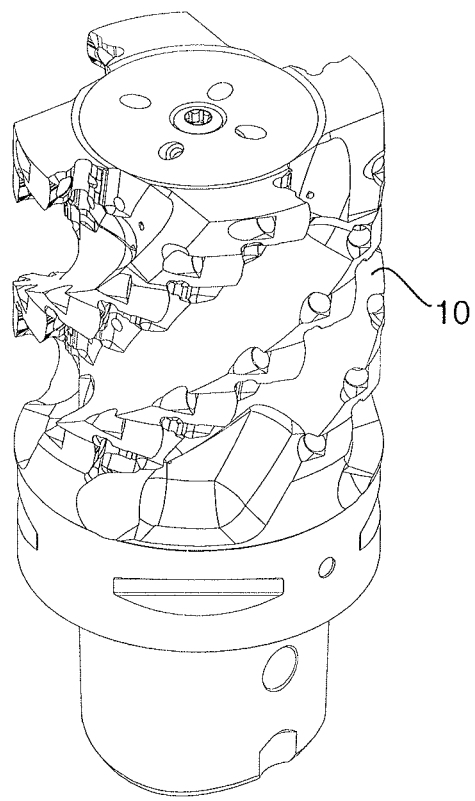
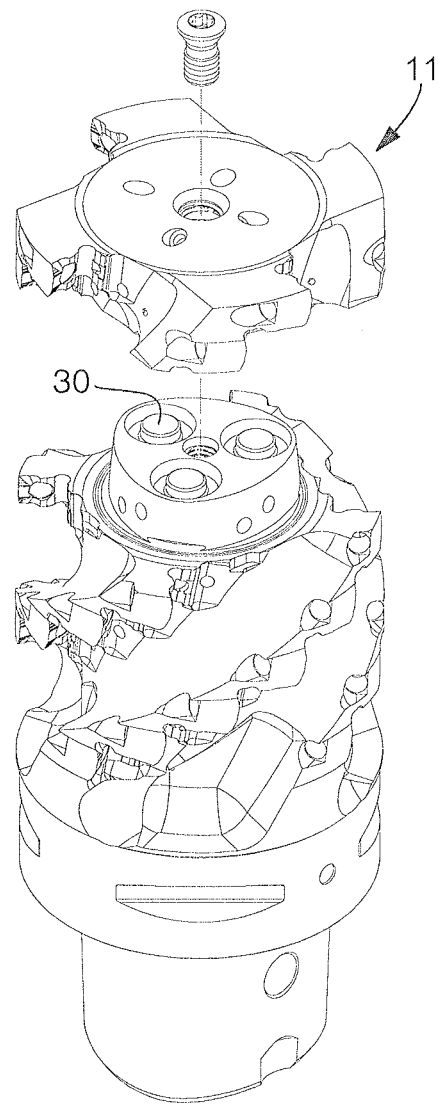
Fig 6
Fig 7

MILLING TOOL FOR CUTTING MACHINING

This application claims priority under 35 U.S.C. §119 to Swedish Patent Application No. 1050243-3, filed on Mar. 17, 2010, which is incorporated by reference herein in its entirety.

FIELD OF THE INVENTION

The present invention relates generally to rotary tools for cutting machining, particularly to tools having integrated damping intended for milling machining.

BACKGROUND OF THE INVENTION

In cutting machining, it is crucial to aim for a dynamically stable cutting process in order to provide an optimum cutting speed, surface finish, machine service life, etc. An important factor to take into consideration is the presence of vibrations or chatter, which may result in dissonance, poor surfaces of machined details, decreased service life of cutting edges, as well as may cause an unpredictable machining process. Vibrations may arise and be found in the entire cutting system that includes machine, workpiece, attachment for workpiece, tool-clamping details, as well as a tool including cutting edges. In use of long tools, or tools provided with one or more extension details or shafts, vibrations in the cutting end are extra pronounced. The presence of vibrations usually leads to a reduction of tool data, such as cutting depth, radial engagement, feed speed or cutting speed. A possible method to counteract vibrations is to reduce the number of active cutting edges in the milling tool, which then also reduces the efficiency of the tool, since it then takes a longer time to carry out the work. So-called differentially pitched milling cutters, where the milling inserts are placed at a varying pitch around the circumference of the milling cutter, are also used to reduce or prevent vibrations in the system.

Other prior art for the reduction of vibrations in tools for rotary machining, and in particular for the reduction of vibrations in milling tools, includes the introduction of a centrally placed damper in the tool body. Usually, this damper is formed from a viscoelastic material, which counteracts operation-induced vibrations in the tool. A problem of this prior art is that the damping becomes limited to a specific frequency or range of frequencies and that the damp body is tuned against a specific natural frequency of the tool system. Furthermore, the size and extension of the damp body is limited, because of the central location, in consideration of the stability and strength of the tool. This is because the centrally placed damper involves that a relatively great part of the load-carrying mass of the tool is removed. Therefore, a damped tool that solves the above mentioned problems is in great demand.

An object of the invention to provide a damped rotary tool for cutting machining. Another object of the invention is to provide a milling tool having improved damping.

SUMMARY OF THE INVENTION

A general embodiment of the present invention includes a milling tool 1 for rotary cutting machining, which includes a tool body 10 having a rotation axis, and a plurality of insert seats 20 adapted to receive respective milling inserts arranged in one end of the tool body. Furthermore, the tool 1 includes a plurality of damping members 30 arranged inside the tool body, which suppress operation-induced vibrations in the tool, the damping members 30 being arranged radially displaced from the rotation axis and adjacent to the one end.

In an embodiment, the invention provides a milling tool for rotary cutting machining, including a tool body having a rotation axis, a plurality of insert seats adapted to receive respective milling inserts arranged in one end of the tool body, and a plurality of damping members arranged inside the tool body which suppress operation-induced vibrations in the tool. The damping members being arranged radially displaced from the rotation axis, displaced from the insert seats, and adjacent to the one end of the tool body.

In another embodiment, the invention provides a milling tool for rotary cutting machining, including a tool body having a rotation axis, a plurality of insert seats arranged in one end of the tool body, a plurality of milling inserts secured in respective insert seats, and a plurality of damping members arranged inside the tool body which suppress operation-induced vibrations in the tool. The damping members being arranged radially displaced from the rotation axis, displaced from the inserts, and adjacent to the one end of the tool body.

Advantages of the invention includes improved damping of the tool in rotary cutting machining, integration of dampers in several different tool geometries, and adaptable damping.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 6 is a perspective view of an additional embodiment of a tool according to the present invention;

FIG. 7 is an exploded diagram of the embodiment in FIG. 6;

DETAILED DESCRIPTION OF THE PREFERRED EMBODIMENTS

Throughout the drawings, the same reference designations will be used for the corresponding or similar elements.

Generally, an embodiment of the invention includes a rotary tool for cutting machining of, for instance, metals and metal alloys. The tool is provided with a plurality of integrated damping members arranged in a radial array to decrease vibrations in both the torsional direction and the radial direction of the tool. By rotary machining, reference is made to situations where the cutting tool is imparted a rotary main motion in relation to its own rotation axis at the same time as the workpiece or the tool carries out a rectilinear or rotary feeding motion. Tools that are embraced by the present invention include one or more of milling cutters, e.g. long-edge milling cutters, corner mills, end mills, shank-end mills, helix milling cutters and the like.

Figure 1:
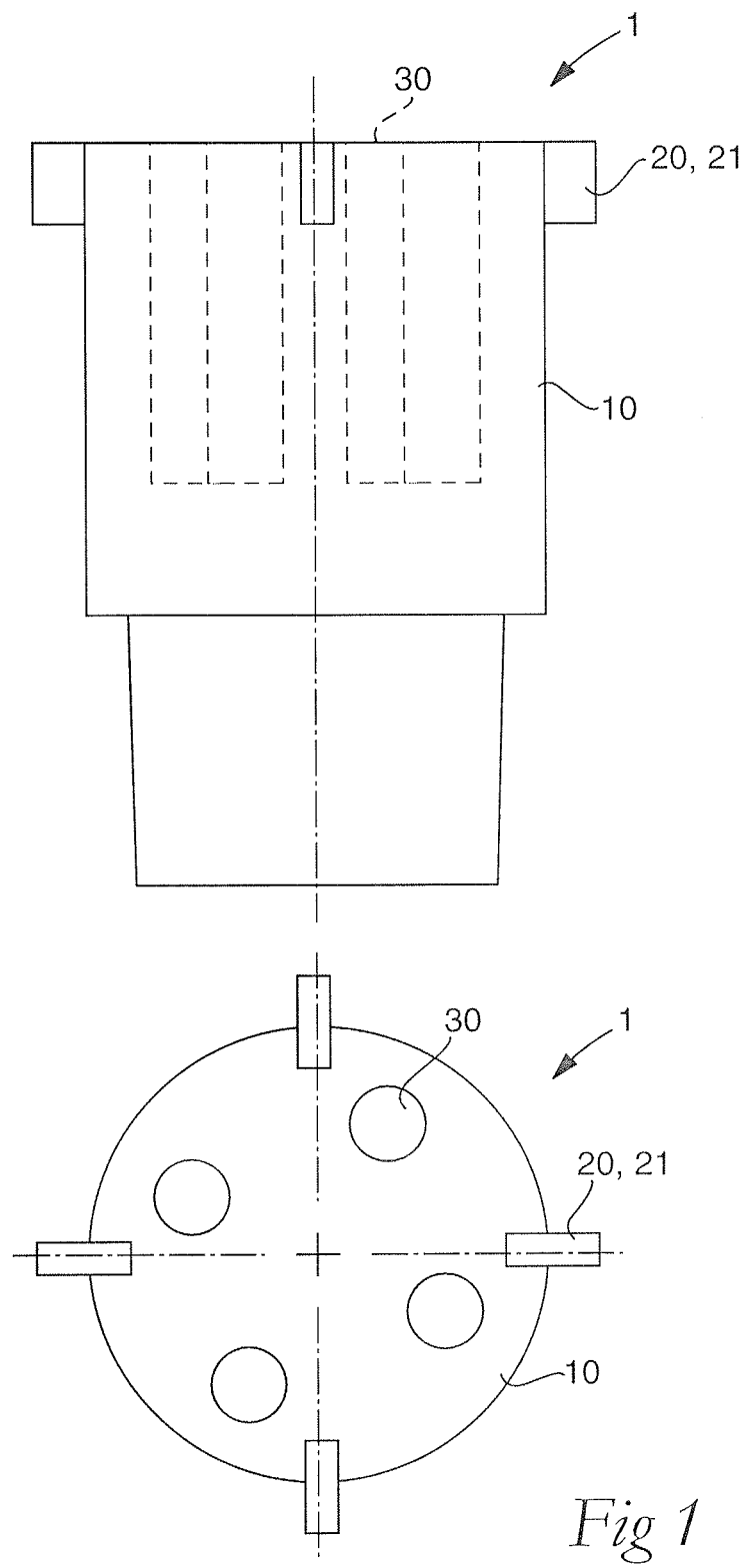
FIG. 1 shows two views of one embodiment of a damped tool according to the present invention.

According to one embodiment, reference being made to FIG. 1, the invention includes a milling tool 1 for rotary cutting machining. The tool 1 includes a tool body 10 that has an extension along its rotation axis (indicated by the dash-dotted line in the upper part of the figure). The tool 1 may also include miscellaneous extension details (not shown) arranged serially along the rotation axis in order to allow deeper plunge-cutting into a workpiece. Furthermore, the tool 1 includes a plurality of insert seats 20 adapted to receive respective milling inserts arranged in one end of the tool body 10. In FIG. 1, four insert seats 20 are shown having milling inserts, but it is also possible to have fewer or more insert seats 20 arranged in the tool body 10. Typically, a tool according to the invention includes three or more insert seats. Finally, the tool 1 includes a plurality of damping members 30 arranged inside the tool body 10 which suppress operation-induced vibrations in the tool. These damping members 30 are arranged radially displaced from the rotation axis of the tool 1, displaced from the insert seats, and adjacent to the previously mentioned one end. The damping members 30 are suitably, but not necessarily, arranged parallel to the rotation axis of the tool 1. Upon deviation from a parallel placement, an angle between the damping members and the rotation axis of the tool should not exceed 10°. In FIG. 1, four such damping members 30 are shown, but it is equally possible to arrange more or fewer damping members 30.

One of the advantages of using a plurality of radially displaced damping elements compared with a centrally placed damping element is that it becomes possible to compensate vibrations over a greater frequency range. There are also other advantages. This advantage and some others will be discussed in more detail in connection with a specific example below.

In order for the use of dampers not to jeopardize the structural stability of the tool body, the volume (and the mass) of the individual damping members are limited by the total volume (and mass) of the tool. This entails that the use of a centrally placed damper presents a narrower limitation of how great a damping mass that can be applied in the tool than if a plurality of radially displaced dampers are used. As an example, it may be mentioned that for an corner mill (diameter 60 mm) having an approximate mass of 1.5 kg, it is possible to include six radially displaced damping members having a total mass of 222 g, while a centrally placed damper only allows 190 g of damping mass. (The example includes the same type of damping member in both milling tools). Thereby, by using a plurality of damping elements, it is possible to get a total oscillating damping mass that exceeds a centrally situated damping mass.

For certain types of tool solutions, it is, because of the design, impossible to integrate a centrally placed damping element. Such a case is illustrated by the milling tool in U.S. Pat. No. 6,595,727, which has a centrally arranged locking screw that is hollow to provide for supply of cooling medium and lubricant to the milling inserts. Another similar case is milling tools for so called ramping, see U.S. Pat. No. 6,945,740. None of these tools can be damped according to the principle of a centrally placed damping element, but by the present invention, the tools can easily be damped and thereby obtain a better cutting performance.

An additional advantage of the present invention is that vibrations generated by torsional vibrations can be damped more efficient when damping elements are arranged radially displaced from the center axis. In addition to this, a spectrum of frequencies is furthermore obtained wherein the damping system can act and in such a way counteract emergence of vibrations, alternatively counteract/reduce arisen vibration tendencies. Furthermore, it is possible to use a plurality of identical damping elements in the tool as well as to use diversified damping elements within the same tool. The diversification may be provided by assigning the damping elements different masses, damping effect or structural design. It is also possible with a combination of the above mentioned types of diversification.

Figure 2:
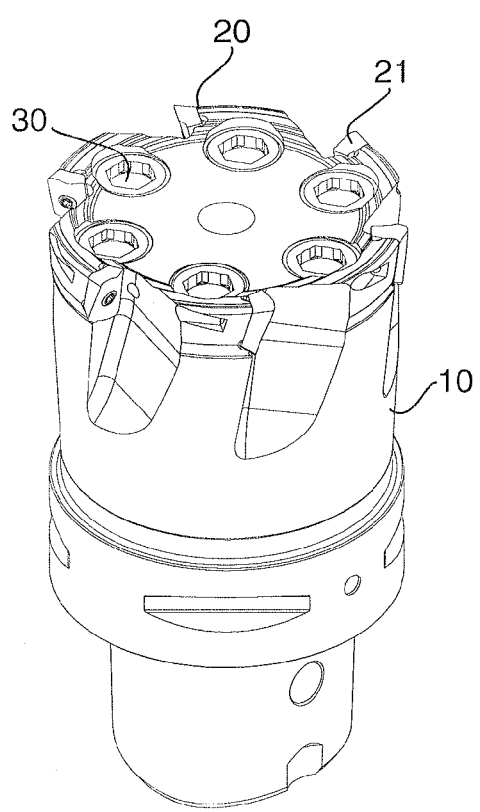
FIG. 2 is a perspective view of one embodiment of the present invention.
Figure 3:
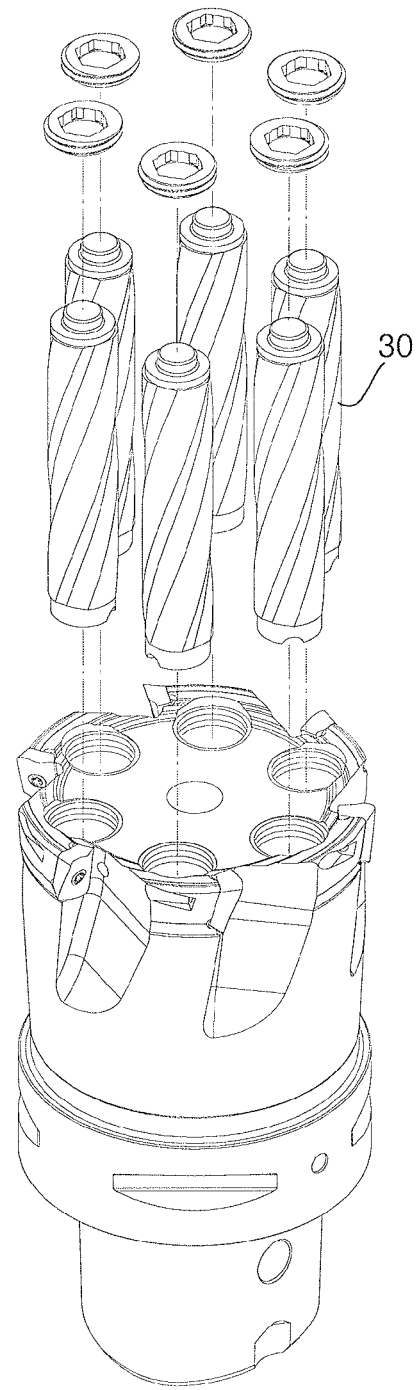
FIG. 3 is an exploded diagram of the embodiment in FIG. 2.

According to a specific embodiment of the invention, the damping elements 30 are arranged in recesses in one end of the tool body, see FIG. 2 and FIG. 3. Each one of these recesses is orientated with its longitudinal axis parallel to the rotation axis of the tool and extends from the cutting end of the tool. The recesses (and thereby the damping elements) may be symmetrically or asymmetrically arranged in respect of the rotation axis.

According to a preferred embodiment, the number of damping members corresponds to the number of insert seats in the tool body, the same symmetry in relation to the rotation axis as the insert seats being assumed. In other words, each one of the plurality of damping members is arranged in correspondence with and in the vicinity of a respective insert seat. This allows that the damping is carried out in close connection to the point where the vibration is induced in the tool, i.e., where the milling insert engages into the workpiece. Thereby, in this case, typically both the number of insert seats and the number of damping members will amount to three or more.

In the embodiment illustrated in FIG. 3, the damped tool 1 is shown in the dismantled state, where the damping elements are removed from the respective recess. In the figure, also cover plates are shown that are used to prevent the damping elements or the insets from mistakenly falling out of the tool. In this embodiment, all damping elements are similar elements, but may also include elements that are tuned for different damping frequencies or frequency intervals, in other words the different damping elements can have different damping effect.

Figure 4:
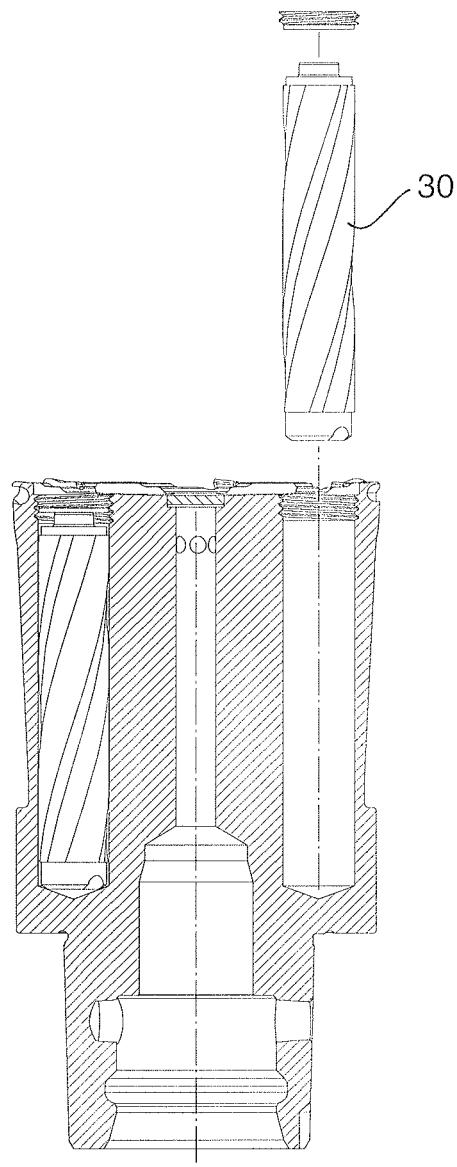
FIG. 4 is a section view of the embodiment in FIG. 2.

In FIG. 4, the embodiment from FIG. 2 is shown in cross-section to show the orientation of the damping elements inside the tool 1. In the embodiment illustrated, the cover plates have been attached by thread engagement in the tool body 10, but it will be appreciated that other types of attachments may be used.

Figure 5:
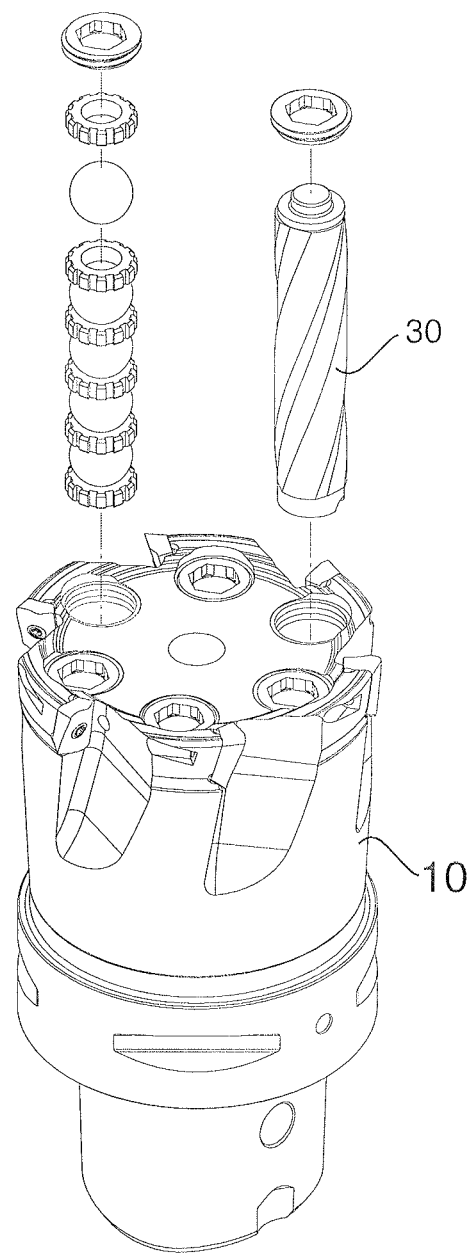
FIG. 5 is an exploded diagram of an additional embodiment of a damped tool according to the present invention.

As previously mentioned, not all damping elements 30 in the tool 1 are necessarily of the same kind. This is illustrated in the exploded diagram in FIG. 5, where two variants of damping elements 30 are shown. One of the variants is an essentially cylindrical inset having a helical groove on the outside of the damping member in order to allow circulation of cooling media in the tool 1. The other variant includes a plurality of spherical damping elements piled on each other and spaced-apart by spacer members. These two variants are only examples; also similar solutions may be applied.

According to an additional preferred embodiment, reference being made to FIG. 6 and FIG. 7, the tool 1 includes a cover 11, which upon mounting, together with the tool body 10, covers the damping members and the recesses thereof in the cutting end of the tool. This cover includes an outermost array of insert seats 20 for the receipt of milling inserts and is adapted to co-operate with the tool body 10 to form the tool 1. The cover 11 may be attached with screws or other equivalent engagement members to the tool body 10. FIG. 6 shows a tool 1 having the cover 11 mounted, and FIG. 7 shows a tool 1 having the cover 11 in the unmounted state.

A specific advantage of this embodiment with a cover that provides the first insert row in the tool is that damping elements can be placed far forward in the tool body without for that sake terminating in the end of the tool. This is particularly advantageous in connection with milling tools for ramping.

As is shown in FIG. 6 and FIG. 7, the tool 1 may include insert seats 20 arranged on the envelope surface of the tool 1. Milling inserts mounted in these insert seats will co-operate with milling inserts arranged in the end in order to allow a longer cutting edge, e.g. a long-edge milling cutter.

According to what previously has been mentioned, it is advantageous that the number of damping elements agrees with the number of insert seats arranged in one end of the tool. However, this is not necessary; also embodiments wherein the number of damping elements differs from the number of insert seats are possible. The major part of the shown embodiments concerns milling tools, in particular long-edge milling cutters.

Advantageously, the damping members (and the corresponding recesses) are rotationally symmetrical. However, this is only an adaptation to manufacturing technique; the same principle may be applied to damping members and recesses having other geometries. Furthermore, essentially cylindrical recesses have been shown, but it is also only an adaptation to manufacturing technique. In the design of damping members in tools, in particular long tools, it is advantageous to concentrate the damping effect close to where the vibrations are greatest. This means in most cases, and in particular for long tools, in the cutting end of the tool and advantageously in close connection to the cutting edges, i.e., at as great a distance from the rotation axis as possible. Therefore, it would also be advantageous with conical damping members and recesses, where the bottom surface of the cone is placed in close connection to the cutting end of the tool.

A further consideration is the presence of cooling channels in the tool. In accordance with the present invention, the damping members and their recesses are adapted to co-operate with at least a part of the cooling channels present in the tool. This means that the damping members themselves are adapted to allow a certain circulation of cooling liquid, as well as that the recesses are adapted to communicate with the cooling channels of the tool.

The damping elements of the present invention relate particularly to such that previously have been disclosed in WO 2008/002145, but also other types of damping elements are possible. Examples may be damping elements in the form of viscoelastic bodies of different designs, e.g., spheres, cylindrical solids, circle- or ring-shaped plates, or combinations thereof. Also different types of damping elements having a mechanical and/or fluid mechanical mode of action may be used.

As previously mentioned, a problem of using a single centrally placed damper is that the damping capacity of the tool becomes ever so locked to a specific frequency and entails that the damp body has to be tuned to a specific damping frequency of the tool system. The tuning of a damper for a tool mounted in a specific machine often works well, but the problems arise when the machine is changed and the natural frequencies of the machine system are altered. The advantage of using a plurality of dampers, according to the present invention, which are tuned at different frequencies, is that the system can be damped over a wider frequency spectrum. This is clearly illustrated in the simulation results following below, reference being made to FIG. 8.

Figure 8:
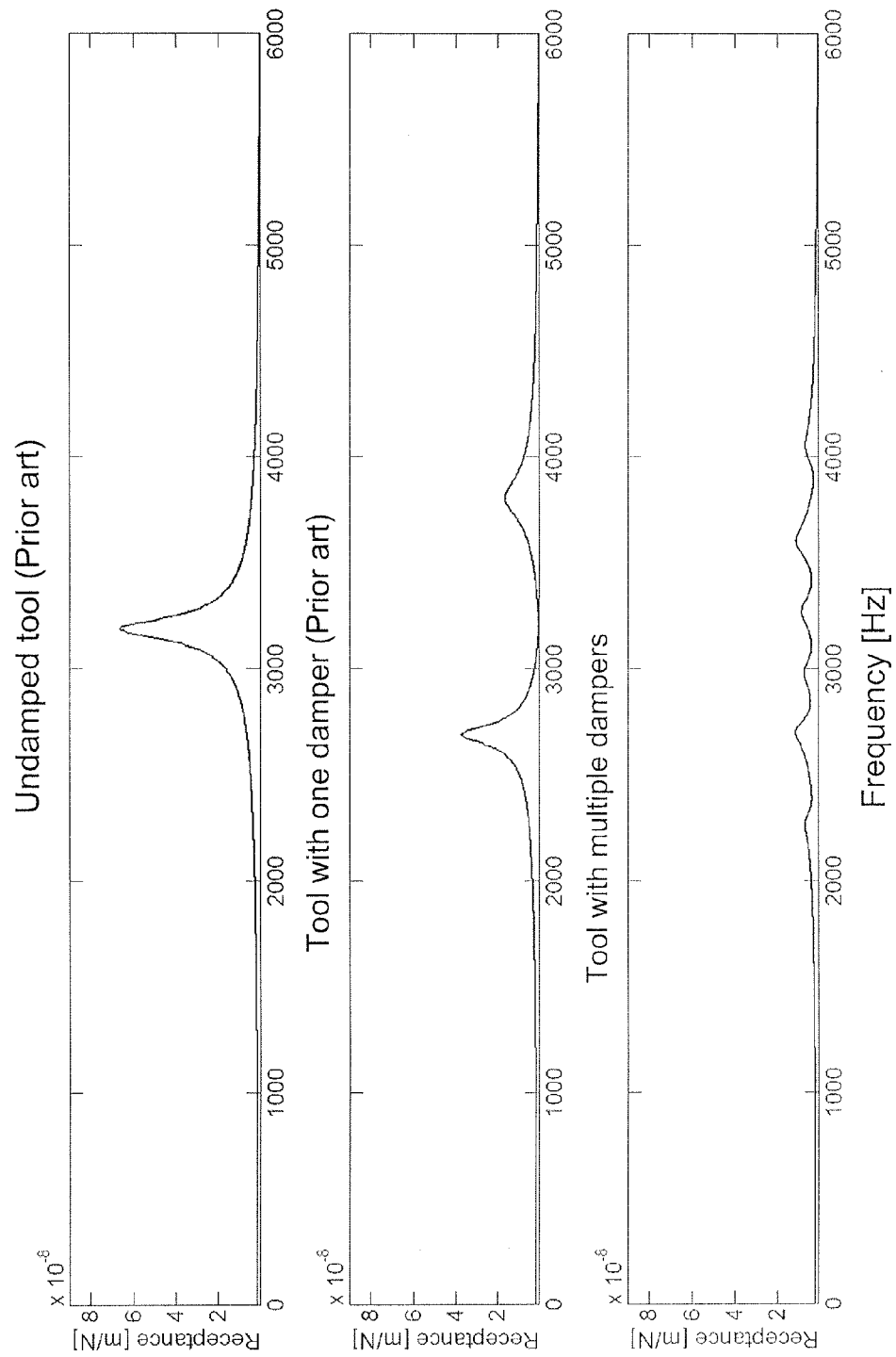
FIG. 8 is a comparison between an embodiment of the present invention and prior art.

FIG. 8 shows the results from three different simulations where 200 different transfer functions have been randomized with a dominant resonance frequency between 3000-3300 Hz. For the sake of simplicity, only one of the transfer functions is shown in the figures. The uppermost illustration shows the result for a known undamped tool. The middle illustration shows the result from the same random transfer functions but with a known damper that has been adjusted or tuned to a mean value of the frequency span, i.e., 3150 Hz but with a random distribution of ±5%. The lowermost illustration shows the result, according to a preferred embodiment of the present invention, from the same random transfer functions but with five dampers adapted or tuned to frequencies between 2300-4000 Hz with an individual distribution of ±5%. Furthermore, the total mass of the five dampers has been the same as the one of the single damper. The illustration clearly shows a distinct lowering of the top amplitudes of the transfer functions ("receptance") of the multiple damper according to the invention compared with the known single damper or the known undamped system.

Figure 9:
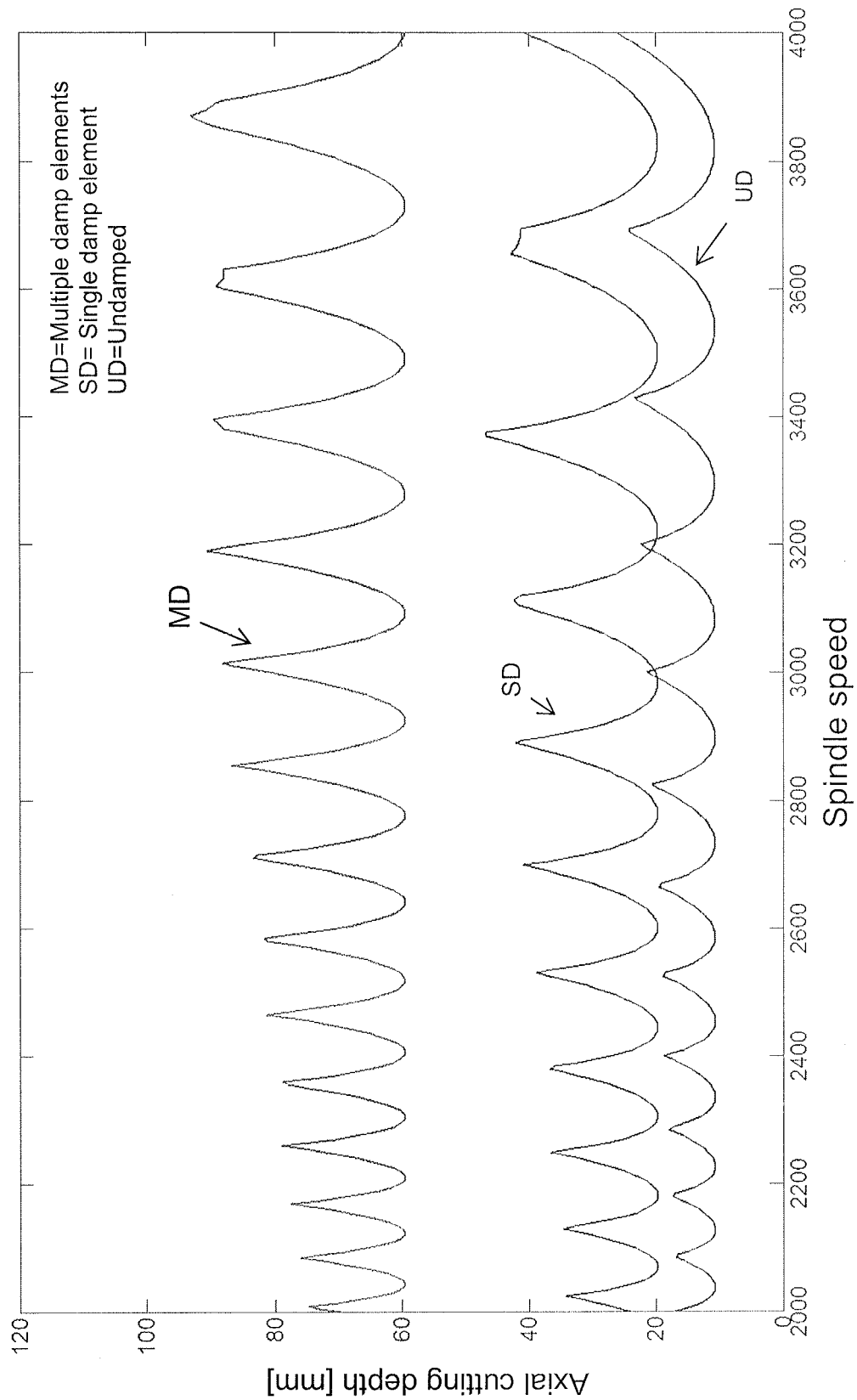
FIG. 9 is an additional comparison between an embodiment of the present invention and prior art.

In order to show the effect of damped systems, a random transfer function has been selected and used to calculate the stability limits of a representative tool, see FIG. 9. By selecting a combination of axial cutting depth and spindle speed that are under the curve in the figure, stability problems are avoided. If instead a combination above the curve is selected, the vibration levels will escalate in an uncontrolled way. The result clearly shows that the multiple damper (MD) entails that the critical cutting depth can be increased many times both compared with the undamped (UD) and single-damped (SD) system. Thereby, the present invention entails that it is possible to remove more material per unit of time in the workpiece, which results in a more efficient process.

As has been described above, it is, by the present invention, possible to combine a plurality of different damping elements in one and the same milling tool to attain a diversification in the damping effect of the tool. However, it is also possible to arrange a plurality of similar, but individually adaptable, damping elements in a milling tool. With adaptable, reference is made to damping elements that are not locked to a specific damping range, but can be adapted or tuned during operation or at least in the mounting of the milling tool.

The present invention is particularly suitable for, but not limited to, tools for the machining of titanium and titanium alloys or material groups that impose similar requirements on the machining process.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A milling tool for rotary cutting machining, comprising:
a tool body having a rotation axis;
a plurality of insert seats adapted to receive respective milling inserts arranged in one end of the tool body; and
a plurality of damping members arranged inside the tool body which suppress operation-induced vibrations in the tool,
the damping members being arranged radially displaced from the rotation axis, displaced from the insert seats, and adjacent to the one end of the tool body.

2. The tool according to claim 1, wherein the tool body comprises a plurality of recesses in which respective damping members are arranged.

3. The tool according to claim 1, wherein the plurality of insert seats are arranged in a common plane in the one end of the tool and adjacent to the envelope surface of the tool for cutting material adjacent to the one end and the envelope surface.

4. The tool according to claim 2, wherein the plurality of damping members are arranged symmetrically with respect to the rotation axis of the tool.

5. The tool according to claim 2, wherein the plurality of damping members are asymmetrically arranged with respect to the rotation axis of the tool.

6. The tool according to claim 1, wherein the number of damping members equals the number of the plurality of insert seats.

7. The tool according to claim 1, wherein the number of damping members and/or the number of insert seats, respectively, amount/amounts to at least three.

8. The tool according to claim 4, wherein the damping members are arranged adjacent to respective insert seats for the receipt of tool inserts.

9. The tool according to claim 1, wherein the damping members are of the same kind.

10. The tool according to claim 1, wherein the plurality of damping members are individually adapted damping members in order to allow a wide frequency damping range.

11. The tool according to claim 10, wherein at least one of the plurality of damping members is adaptable.

12. The tool according to claim 1, wherein the recesses mouth in the one end of the tool.

13. A milling tool for rotary cutting machining, comprising:
    a tool body having a rotation axis;
    a plurality of insert seats adapted to receive respective milling inserts arranged in one end of the tool body; and
    a plurality of damping members arranged inside the tool body which suppress operation-induced vibrations in the tool,
    the damping members being arranged radially displaced from the rotation axis, displaced from the insert seats, and adjacent to the one end of the tool body,
    wherein the tool body comprises a plurality of recesses in which respective damping members are arranged, and
    wherein the recesses are arranged to entirely be contained in the tool body by a cover arranged in the one end of the tool.

14. The tool according to claim 2, wherein the recesses are rotationally symmetrical.

15. The tool according to claim 14, wherein the recesses are conically tapering in relation to the one end.

16. A milling tool for rotary cutting machining, comprising:
    a tool body having a rotation axis;
    a plurality of insert seats adapted to receive respective milling inserts arranged in one end of the tool body; and
    a plurality of damping members arranged inside the tool body which suppress operation-induced vibrations in the tool,
    wherein the damping members are arranged radially displaced from the rotation axis, displaced from the insert seats, and adjacent to the one end of the tool body,
    wherein the tool body comprises a plurality of recesses in which respective damping members are arranged, and
    wherein the tool comprises a plurality of cooling channels arranged to communicate and co-operate with the recesses.

17. The tool according to claim 1, wherein the tool is particularly for milling machining of titanium and alloys thereof.

18. The tool according to claim 1, wherein the tool is a long-edge milling cutter.

19. The tool according to claim 1, wherein the damping members are arranged parallel to the rotation axis.

20. A milling tool for rotary cutting machining, comprising:
    a tool body having a rotation axis;
    a plurality of insert seats arranged in one end of the tool body;
    a plurality of milling inserts secured in respective insert seats; and
    a plurality of damping members arranged in a plurality of recesses inside the tool body which suppress operation-induced vibrations in the tool,
    the damping members being arranged radially displaced from the rotation axis, displaced from the inserts, and adjacent to the one end of the tool body.

21. The tool according to claim 20, wherein the tool comprises a plurality of cooling channels arranged to communicate and co-operate with the recesses.

22. The tool according to claim 1, wherein the damping members are tuned at different frequencies.

23. The tool according to claim 1, including a cover, wherein the cover is attached to the one end of the tool body and covers the recesses.

24. The tool according to claim 23, wherein the cover includes an outermost array of insert seats for the receipt of milling inserts.

25. The tool according to claim 1, wherein the operation-induced vibrations include vibrations in both the torsional direction and the radial direction of the tool.

26. The tool according to claim 1, wherein the damping members are essentially cylindrical in shape with a helical groove on an outer surface to allow circulation of cooling media in the tool.

27. The tool according to claim 1, wherein the recesses are arranged to entirely be contained in the tool body by a cover arranged in the one end of the tool.

28. The tool according to claim 1, wherein an angle between a longitudinal axis of each damping member and the rotation axis of the tool does not exceed 10°.

29. The tool according to claim 2, wherein each of the recesses is orientated with its longitudinal axis parallel to the rotation axis of the tool and extends from the cutting end of the tool.

* * * * *